(12) United States Patent
Ida et al.

(10) Patent No.: US 11,025,829 B2
(45) Date of Patent: Jun. 1, 2021

(54) IMAGING APPARATUS, ACCESSORY, PROCESSING APPARATUS, PROCESSING METHOD, AND STORAGE MEDIUM

(71) Applicant: CANON KABUSHIKI KAISHA, Tokyo (JP)

(72) Inventors: Yoshiaki Ida, Utsunomiya (JP); Chiaki Inoue, Utsunomiya (JP); Yuichi Kusumi, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/401,677

(22) Filed: May 2, 2019

(65) Prior Publication Data
US 2019/0356836 A1    Nov. 21, 2019

(30) Foreign Application Priority Data
May 16, 2018  (JP) .............................. JP2018-094869

(51) Int. Cl.
*H04N 5/235*   (2006.01)
*G06T 7/00*    (2017.01)
*G06T 7/586*   (2017.01)

(52) U.S. Cl.
CPC .......... *H04N 5/2354* (2013.01); *G06T 7/586* (2017.01); *G06T 7/97* (2017.01); *H04N 5/2351* (2013.01); *G06T 2207/10152* (2013.01)

(58) Field of Classification Search
None
See application file for complete search history.

(56) References Cited

U.S. PATENT DOCUMENTS

| 7,429,117 | B2 * | 9/2008 | Pohlert ............... | H04N 5/2256 362/11 |
| 9,052,495 | B2 | 6/2015 | Ida | |
| 2015/0011894 | A1 * | 1/2015 | Sarrafzadeh ........... | G06T 7/586 600/476 |
| 2015/0374210 | A1 * | 12/2015 | Durr ...................... | A61B 1/07 600/111 |
| 2016/0073853 | A1 * | 3/2016 | Venkatesan .......... | A61B 1/3132 348/68 |
| 2016/0341973 | A1 | 11/2016 | Ida et al. | |
| 2017/0262969 | A1 | 9/2017 | Inoue et al. | |
| 2018/0232899 | A1 * | 8/2018 | Lansel ................ | H04N 5/2256 |
| 2019/0104980 | A1 * | 4/2019 | Farooq .................. | A61B 5/444 |
| 2019/0129011 | A1 * | 5/2019 | Ruffo .................... | G01S 7/4815 |

FOREIGN PATENT DOCUMENTS

JP          2017161374 A      9/2017

* cited by examiner

*Primary Examiner* — James M Hannett
(74) *Attorney, Agent, or Firm* — Carter, DeLuca & Farrell LLP

(57) ABSTRACT

An imaging apparatus includes an image sensor configured to photoelectrically convert an object image formed by an imaging optical system in at least three states in which positions of light sources configured to emit light are different from each other, and to output at least three image data, and a luminance distribution acquirer configured to acquire information on a plurality of luminance distributions of the image data based on common information on a common light amount distribution regarding the at least three states.

11 Claims, 5 Drawing Sheets

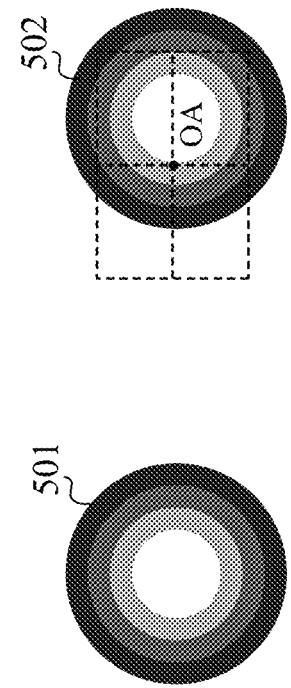
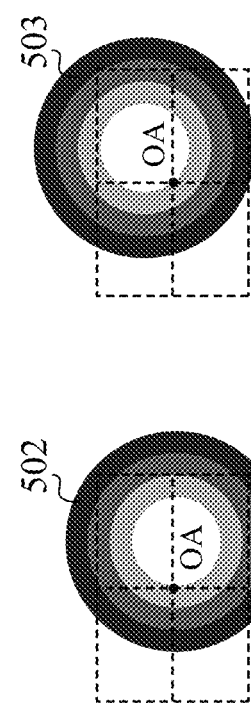
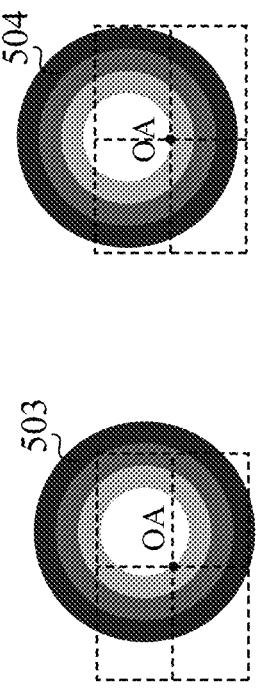
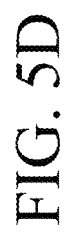
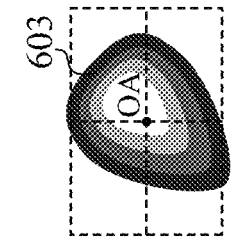
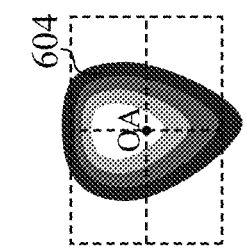
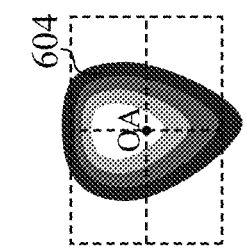
FIG. 5A  FIG. 5B  FIG. 5C  FIG. 5D
FIG. 6A  FIG. 6B  FIG. 6C  FIG. 6D

IMAGING APPARATUS, ACCESSORY, PROCESSING APPARATUS, PROCESSING METHOD, AND STORAGE MEDIUM

BACKGROUND OF THE INVENTION

Field of the Invention

The present invention relates to an imaging apparatus that provides a photometric stereo method.

Description of the Related Art

It is known that the photometric stereo method can provide a surface normal of an object. The photometric stereo method uses the luminance change information of the object according to the light source position and thus requires light amount information of a light source. Accordingly, U.S. Patent Application Publication No. ("US") 2017/0262969 discloses a method of detecting the brightness and temperature of each of a plurality of light sources, of correcting the light amount scattering, and of acquiring the information of the normal of the object.

The method disclosed in US 2017/0262969 does not correct the uneven light amount (uneven illuminance) in the image, and thus requires to be uniform the light amount distributions incident on the object in the imaging areas from the light sources located at different positions. For example, the light sources may emit ideal parallel light, but are actually diffusing light sources distant from the object by finite distances. It is thus difficult to make equal the light amount distributions incident from these light sources located at different positions to each other on the object surface.

SUMMARY OF THE INVENTION

The present invention provides an imaging apparatus, an accessory, a processing apparatus, a processing method, and a storage medium, each of which can correct uneven illuminance among a plurality of images with small data capacity and small calculation load.

An imaging apparatus according to one aspect of the present invention includes an image sensor configured to photoelectrically convert an object image formed by an imaging optical system in at least three states in which positions of light sources configured to emit light are different from each other, and to output at least three image data, and a luminance distribution acquirer configured to acquire information on a plurality of luminance distributions of the image data based on common information on a common light amount distribution regarding the at least three states.

An accessory according to another aspect of the present invention attachable to and detachable from an imaging apparatus includes a light emitter configured to individually emit light at least three different light source positions; and a communicator configured to transmit (a) common information on a common light amount distribution for the light source positions of the light emitter or (b) information that enables to acquiring the common information.

A processing apparatus according to another aspect of the present invention includes a light amount distribution information acquirer configured to acquire common information on a common light amount distribution for at least three different light source positions, and a luminance distribution acquirer configured to acquire, based on the common information, information on the luminance distribution of at least three image data obtained by imaging in at least three states in which a position of a light source that emits light is different from each other. A processing method corresponding to the processing apparatus and a storage medium storing a program that causes a computer to execute the above processing method also constitute another aspect of the present invention.

Further features of the present invention will become apparent from the following description of exemplary embodiments with reference to the attached drawings.

BRIEF DESCRIPTION OF THE DRAWINGS

FIGS. 5A-5D are explanatory diagrams of light amount distribution information and a light amount distribution in each light source according to a first embodiment.

FIGS. 6A-6D are explanatory diagrams of light amount distribution information and a light amount distribution of each light source according to a second embodiment.

DESCRIPTION OF THE EMBODIMENTS

Referring now to the accompanying drawings, a detailed description will be given of embodiments according to the present invention.

Figure 7:
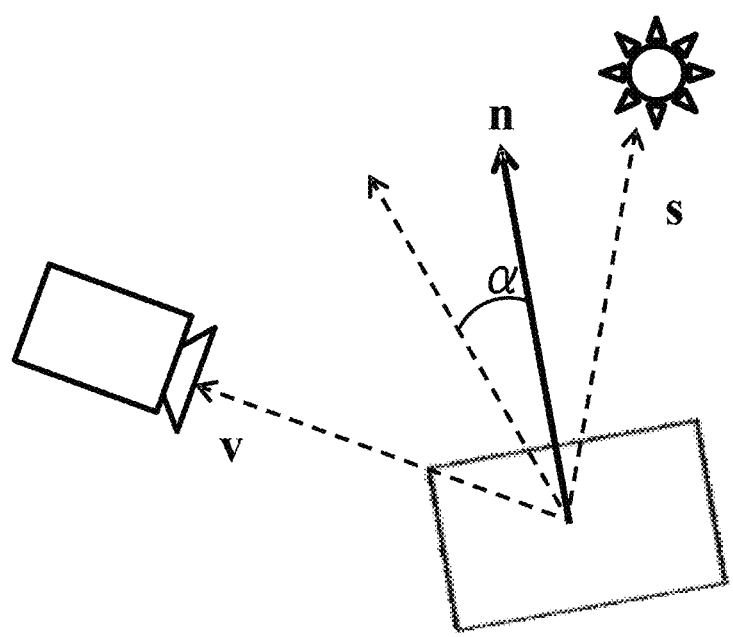
FIG. 7 is an explanatory view of a specular reflection component in each embodiment.

A description will now be given of an outline of a photometric stereo method according to this embodiment. The photometric stereo method assumes a reflection characteristic of an object based on a surface normal of the object and a direction from the object to a light source, and calculates the surface normal based on the reflection characteristic assumed to be the luminance information of the object at a plurality of light source positions. The reflection characteristic may be approximated by the Lambert reflection model in accordance with the Lambert cosine law if the reflectance is not uniquely determined given a predetermined surface normal and the position of the light source. FIG. 7 is an explanatory view of a specular reflection component in the Lambert reflection model. As illustrated in FIG. 7, the specular reflection component depends on an angle $\alpha$ between a bisector of a light source vector s and a visual line direction vector v, and a surface normal n. Hence, the reflection characteristic may be a characteristic based on the visual line direction. The luminance information may be obtained by imaging the object when the light source is turned on and the object when the light source is turned off, and by calculating a difference between them to remove the influence of a light source other than the light source such as ambient light.

A description will now be given of the reflection characteristic assumed in the Lambert reflection model. Assume that i represents a luminance value of reflected light, $\rho_d$ represents a Lambert diffuse reflectance of an object, E represents an intensity of the incident light, s is a unit vector (light source direction vector) indicating the direction from the object to the light source (light source direction), and n represents a unit surface normal vector of the object. Then, the luminance value i is represented by the following expression (1) according to the Lambert cosine law.

$$i = E\rho_d s \cdot n \qquad (1)$$

Now assume that $s_1, s_2, \ldots, s_M$ represent components of different M (M≥3) light source vectors, and $i_1, i_2, \ldots, i_M$ represent luminance values of the components of the light source vectors. The expression (1) is expressed by the following expression (2).

$$\begin{bmatrix} i_1 \\ \vdots \\ i_M \end{bmatrix} = \begin{bmatrix} s_1^T \\ \vdots \\ s_M^T \end{bmatrix} E\rho_d n \qquad (2)$$

In the expression (2), the left side represents a luminance vector of M rows and 1 column, the right side $[s_1^T, \ldots, s_M^T]$ represents an incident light matrix S indicating the light source direction of M rows and 3 columns, and n represents a unit surface normal vector of 3 rows and 1 column. For M=3, using the inverse matrix $S^{-1}$ of the incident light matrix S, $E\rho_d n$ is expressed by the following expression (3).

$$E\rho_d n = S^{-1} \begin{bmatrix} i_1 \\ \vdots \\ i_M \end{bmatrix} \qquad (3)$$

The norm of the vector on the left side in the expression (3) is a product of the intensity E of the incident light and the Lambert diffuse reflectance $\rho_d$, and a normalized vector is calculated as the surface normal vector of the object. In other words, since the intensity E of the incident light and the Lambert diffuse reflectance $\rho_d$ appear in the conditional expression only in the form of a product, when $E\rho_d$ is assumed to be one variable, the expression (3) having two degrees of freedom of the unit surface normal vector n can be regarded as a simultaneous expression that determines totally three unknown variables. Hence, each variable can be determined by acquiring luminance information using at least three light sources. When the incident light matrix S is not a regular matrix, there is no inverse matrix and it is thus necessary to select each of the components $s_1$ to $s_3$ in the incident light matrix S so that the incident light matrix S becomes the regular matrix. In other words, the component $s_3$ may be selected linearly and independently relative to the components $s_1$ and $s_2$.

For M>3, the number of conditional expressions is more than the number of unknown variables to be found. Hence, the unit surface normal vector n may be calculated from the three arbitrarily selected condition expressions in the same manner as that of M=3. When four or more conditional expressions are used, the incident light matrix S is not a regular matrix and thus, for example, an approximate solution may be calculated using the Moore-Penrose pseudo inverse matrix. Alternatively, the unit surface normal vector n may be calculated by the fitting method or the optimization method.

Assume the reflection characteristic of the object different from the Lambert reflection model. Then, the conditional expression may differ from a linear expression for each component in the unit surface normal vector n. Once the number of conditional expressions is equal to or more than the number of unknown variables, the fitting method or the optimization method can be used.

For M>3, a plurality of or 3 or more and M-1 or less conditional expressions are obtained, and thus a plurality of solution candidates of the unit surface normal vector n can be obtained. Then, the solution may be selected from the plurality of solution candidates using yet another condition. For example, the continuity of the unit surface normal vector n can be used as the condition. When the unit surface normal n is calculated for each pixel in the imaging apparatus, the surface normal at a pixel (x, y) is n(x, y), and n(x−1, y) is known, the solution having the smallest evaluation function represented by the following expression (4) may be selected.

$$1 - n(x,y) \cdot n(x-1, y) \qquad (4)$$

If n(x+1, y) and n(x, y±1) are also known, the solution that minimizes the expression (5) below may be selected.

$$4 - n(x,y) \cdot n(x-1,y) - n(x,y) \cdot n(x+1,y) - n(x,y) \cdot n(x,y-1) - n(x,y) \cdot n(x,y+1) \qquad (5)$$

Assume that there is no known surface normal and there is indeterminacy of the surface normal at all pixel positions. Then, the solution may be selected so as to minimize the sum of all pixels in the expression (5), as shown by the expression (6) below.

$$\sum_{x,y} \{4 - n(x, y) \cdot n(x-1, y) - n(x, y) \cdot n(x+1, y) - n(x, y) \cdot n(x, y-1) - n(x, y) \cdot n(x, y+1)\} \qquad (6)$$

A surface normal at a pixel other than the closest pixel, or an evaluation function weighted according to the distance from the pixel position of interest may be used. As another condition, the luminance information at an arbitrary light source position may be used. In the diffuse reflection model represented by the Lambert reflection model, the luminance of the reflected light increases as the unit surface normal vector and the light source direction vector are closer to each other. Hence, the unit surface normal vector can be determined by selecting a solution close to the light source direction vector having the largest luminance value among the luminance values in the plurality of light source directions.

In the specular reflection model, the following expression (7) is established where s is a light source vector, and v a unit vector in a direction from an object to a camera (visual line vector of the camera).

$$s + v = 2(v \cdot n)n \qquad (7)$$

If the light source direction vector s and the visual line vector v of the camera are known, the unit surface normal vector n can be calculated as represented by the expression (7). When the surface is rough, the specular reflection also has a spread of the output angle, but it spreads around the solution found as a smooth surface, so the candidate closest to the solution may be selected for the smooth surface among the plurality of solution candidates. The true solution may be determined by averaging the plurality of solution candidates.

For example, as understood from the expression (1), the intensity E of the incident light influences the estimation result of the normal information in the photometric stereo method. In a series of captured images captured at a plurality of light source positions, when a luminance change at a certain pixel is addressed, if a light amount for each light source scatters relative to an expected value, the normal is estimated such that luminance value i on the left side scatters. The scattering light amount is also caused by the scattering light emission amount for each light source or the light amount distribution when the light from the light source enters the object surface (uneven illuminance, light amount distribution). In particular, it is difficult to make a design and provide a control such that the light amount distribution (uneven luminance) can be equal to each other on the object surface with the light sources located at different positions in a general imaging apparatus having a freedom degree in capturing an imaging distance, and it is thus necessary to correct the luminance value of the obtained image.

First Embodiment

Figure 1:
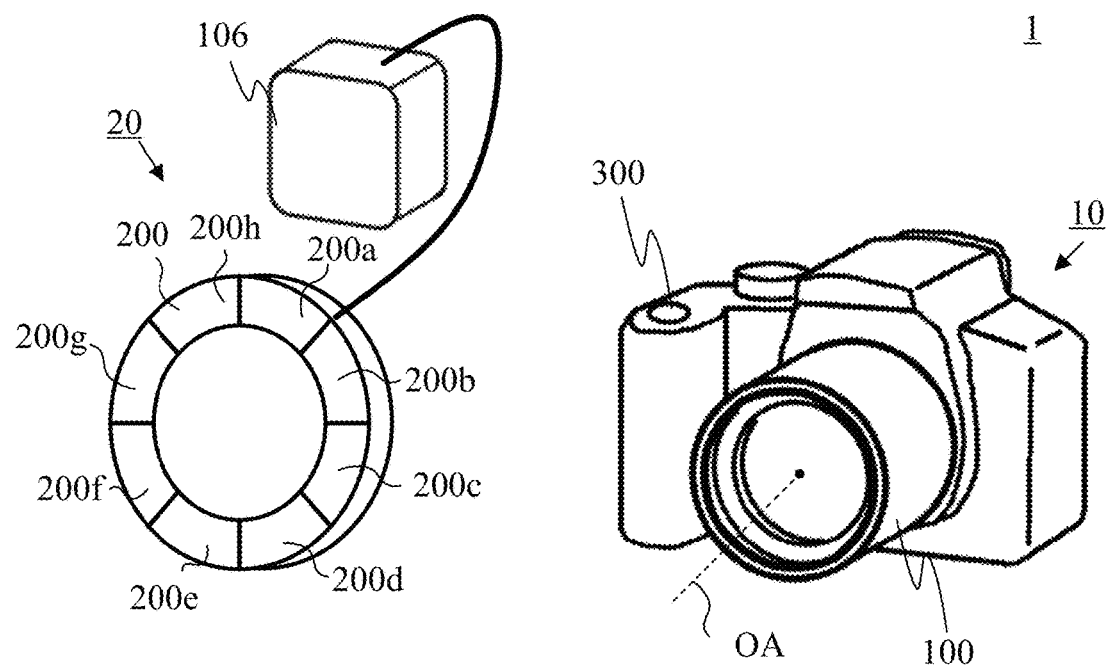
FIG. 1 is an overview of an imaging system according to each embodiment.
Figures 2A, 2B:
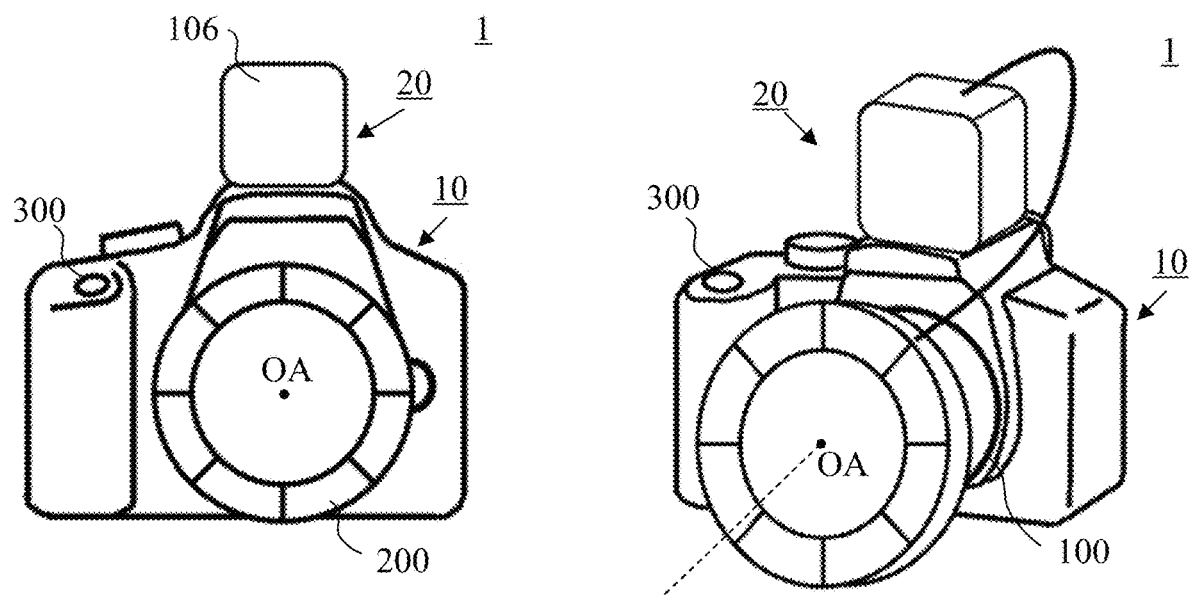
FIGS. 2A and 2B are overviews of the imaging system according to each embodiment.
Figure 3:
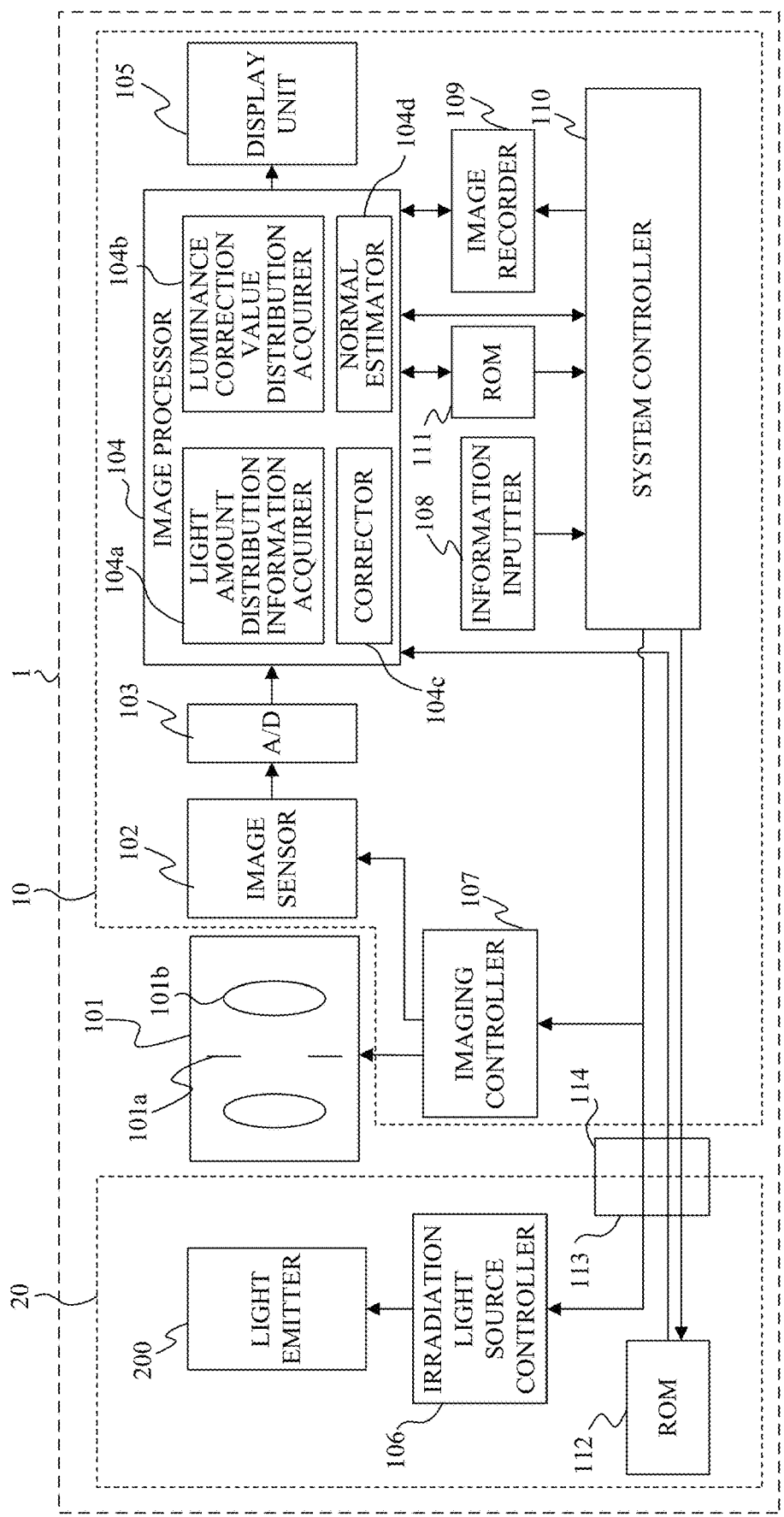
FIG. 3 is a block diagram of the imaging system according to each embodiment.

Referring now to FIGS. 1 to 3, a description will be given of an imaging system according to a first embodiment of the present invention. The imaging system 1 according to this embodiment includes an imaging apparatus (camera body) 10, a lens apparatus (interchangeable lens) 100, and an illumination apparatus (accessory) 20 that can be attached to and detached from the imaging apparatus 10. FIG. 1 is an overview of an imaging system 1 according to this embodiment where the imaging apparatus 10 is separated from the illumination apparatus 20. FIGS. 2A and 2B are overviews of the imaging system 1 where the illumination apparatus 20 is attached the imaging apparatus 10. FIG. 2A is a front view of the imaging system 1, and FIG. 2B is a perspective view of the imaging system 1. FIG. 3 is a block diagram of the imaging system 1.

As illustrated in FIGS. 1, 2A, and 2B, the illumination apparatus 20 includes a light emitter 200 and an irradiation light source controller 106. The light emitter 200 is attached to the lens apparatus 100, and the irradiation light source controller 106 is attached to the body of the imaging apparatus 10. According to this embodiment, the light emitter 200 includes, but is not limited to, eight light sources 200a to 200h. Since the photometric stereo method needs at least three light sources, the light emitter 200 may include at least three light sources. While this embodiment arranges the eight light sources 200a to 200h concentrically at equal intervals from the optical axis OA in the imaging optical system in the lens apparatus 100, but the present invention is not limited to this embodiment.

This embodiment provides the light emitter 200 to the illumination apparatus 20 attachable to and detachable from the imaging apparatus 10, but the present invention is not limited to this embodiment. The light emitter 200 may be integrated with the imaging apparatus 10. The photometric stereo method requires at least three images captured in at least three states (at least three light emission patterns) in which the positions of the light sources that emit light are different from one another, but the present invention is unnecessarily limited to the configuration that provides a plurality of light sources as in this embodiment. For example, one light source and a moving unit for moving the light source may be provided, and imaging may be performed at three or more different light source positions by moving the light source using the moving unit. A release button 300 is an operation unit for instructing the imaging and autofocusing.

The lens apparatus 100 includes an imaging optical system 101 that forms an object image. The imaging optical system 101 includes an aperture stop (diaphragm) 101a and a lens unit 101b, and focuses light emitted from an object on an image sensor 102. According to this embodiment, the lens apparatus 100 provided with the imaging optical system 101 is detachably attached to the imaging apparatus 10, but the present invention is not limited to this embodiment. The lens apparatus 100 may be integrated with the imaging apparatus 10. The image sensor 102 includes a photoelectric conversion elements such as a CCD sensor and a CMOS sensor, photoelectrically converts an object image (optical image) formed by the imaging optical system 101, and outputs image data. An analog electrical signal generated by a photoelectric conversion of the image sensor 102 is converted into a digital signal by an A/D converter 103 and input to an image processor 104.

The image processor (processing apparatus) 104 performs various types of image processing for a digital signal input from the A/D converter 103. The image processor 104 also acquires surface normal information of the object. The surface normal information includes, but is not limited to, information for determining at least one candidate with one freedom degree of the surface normal, information for selecting a true solution from a plurality of surface normal solution candidates, information on the validity of the surface normal, etc.

The image processor 104 includes a light amount distribution information acquirer 104a, a luminance distribution acquirer 104b, a corrector 104c, and a normal estimator 104d. The light amount distribution information acquirer 104a acquires light amount distribution information (common information) on a common light amount distribution regarding a light emission pattern for acquiring the surface normal information of the light emitters 200 (light sources 200a to 200h). The luminance distribution acquirer 104b acquires information on a plurality of luminance distributions (luminance correction value distribution) of each of a plurality of image data captured by individually (sequentially) turning on the light sources 200a to 200h based on the light amount distribution information (common information) common to each light emission pattern. The information on the luminance distribution (luminance correction value distribution) corresponding to each image data is information for correcting the influence (difference between image data due to light amount distribution of each light source) on the luminance value of the image data by the light amount distribution (uneven illuminance) in the object space of the light source that emits light in acquiring each image data. The information on the luminance distribution (luminance correction value distribution) is used to improve the acquisition accuracy of the surface normal information by the photometric stereo method, and is not used to correct the difference itself in the appearance or view of the object caused by the different position of the light source that emits light when each image data is acquired. The corrector 104c corrects the luminance values of the plurality of image data based on the information on the luminance distribution. The normal estimator 104d estimates the normal information of the object based on the luminance distribution and the plurality of image data (or based on the plurality of corrected image data).

The output image processed by the image processor 104 is stored in an image recorder 109, such as a semiconductor memory and an optical disc. The output image may be displayed on a display unit 105. According to this embodiment, each of the light amount distribution information acquirer 104a, the luminance distribution acquirer 104b, the corrector 104c, and the normal estimator 104d is provided in the imaging apparatus 10, but the present invention is not limited to this embodiment. For example, as described later, each unit may be provided in an apparatus (a personal computer, a smartphone, a tablet terminal, or the like) different from the imaging apparatus 10.

An information inputter 108 supplies a system controller 110 with an imaging condition, such as an F-number (aperture value), exposure time, focal length, etc., selected by the user. The irradiation light source controller 106 controls the light emission state of the light emitter 200 in accordance with the instruction output from the system controller 110 via the communicators 113 and 114. The imaging controller 107 acquires an image under a desired imaging condition selected by the user based on the information output from the system controller 110. A ROM (memory) 111 stores a variety of programs to be executed by the system controller 110 and data necessary for the programs. A ROM (memory) 112 incorporated in the illumination apparatus 20 stores a table that records the light amount distribution information acquired by the light amount distribution information acquirer 104a. The light amount distribution information stored in the ROM 112 is transmitted to the light amount distribution information acquirer 104a via the communicator 113 in the illumination apparatus 20 and the communicator 114 in the imaging apparatus 10.

This embodiment stores the light amount distribution information in the ROM 112 in the illumination apparatus 20, but the present invention is not limited to this embodiment. For example, the light amount distribution information is stored in the ROM 111 in the imaging apparatus 10 and the system controller 110 acquires the light amount distribution information based on the information (such as accessory ID) for specifying the illumination apparatus 20 obtained from the illumination apparatus 20. This information is stored, for example, in the ROM 112 and transmitted to the system controller 110 via the communicators 113 and 114.

Figure 4:
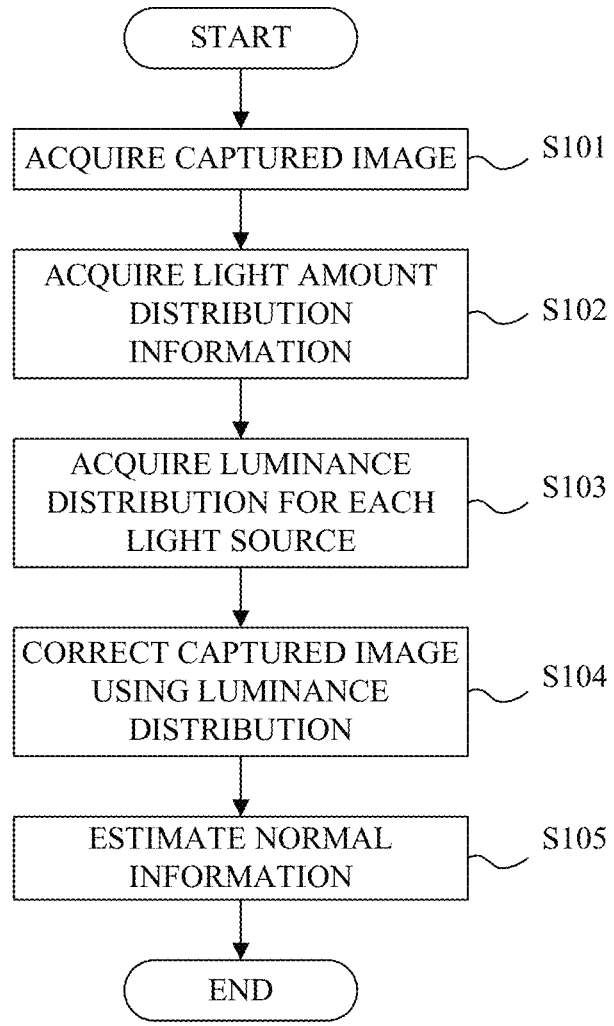
FIG. 4 is a flowchart of a processing method according to each embodiment.

Referring now to FIGS. 4 and 5A to 5D, a description will be given of a processing method (normal information calculation processing) according to this embodiment. FIG. 4 is a flowchart of the processing method (normal information calculation processing) according to this embodiment. The normal vector information calculation processing according to this embodiment is executed by the system controller 110 and the image processor 104 in accordance with a processing program for causing a computer to function as a processing apparatus. The processing program may be recorded, for example, in a non-transitory computer-readable storage medium. FIGS. 5A-5D are explanatory diagrams of the light amount distribution information and light amount distribution of each light source according to this embodiment.

First, in the step S101, the system controller 110 sets an imaging condition (F-number, exposure time, focal length, etc.) set by the user from the information inputter. Then, the system controller 110 captures an object image under the set imaging condition in response to the full pressing operation of the release button 300 by the user. More specifically, the system controller 110 sequentially (individually) irradiates the light onto the object from at least three differently positioned light sources among the light emitters 200 that is divided into eight (light sources 200a to 200h) via the irradiation light source controller 106. The system controller 110 controls the imaging optical system 101 and the image sensor 102 via the imaging controller 107 while at least three light sources are individually (sequentially) emit light for a plurality of image captures. Thereby, the image sensor 102 outputs analog signals corresponding to a plurality of image data captured while at least three light sources are sequentially (individually) emit light. The A/D converter 103 performs an analog-to-digital conversion for the analog signal output from the image sensor 102 to form a captured image (luminance information), and outputs the image to the image processor 104. The image processor 104 may execute usual development processing or various image correction processing so as to generate the image.

Next, in the step S102, the system controller 110 causes the light amount distribution information acquirer 104a to acquire the light amount distribution information corresponding to the current imaging distance (imaging condition) from the ROM 112 in the illumination apparatus 20. According to this embodiment, the light amount distribution information is the light amount distribution information common to the plurality of light sources 200a to 200h. The light amount distribution information is, for example, light amount distribution information 501 illustrated in FIG. 5A, and is a light amount distribution rotationally symmetric on the object plane. The light amount distribution information acquirer 104a acquires, for example, but not limited to, a coefficient (data for acquiring the light amount distribution) as the light amount distribution information by fitting a light amount change in the radial direction from the symmetry axis as a polynomial for the radius.

Next, in the step S103, the luminance distribution acquirer 104b acquires information on a plurality of luminance distributions (luminance correction value distributions) corresponding to each image data based on one common light amount distribution information acquired in the step S102. FIGS. 5B-5D respectively illustrate light amount distributions 502, 503, and 504 on the object surface when the light source on the right side, the light source on the upper right side, and the light source on the upper side emit light in the light emitter 200. The plurality of light amount distributions 502, 503, and 504 are mutually symmetric with respect to the optical axis OA in the imaging optical system 101 or the center of the image (the center of the imaging surface of the image sensor 102). In other words, for example, when the light amount distribution 502 is rotated at a certain angle around the image center, the light amount distributions 503 and 504 are obtained. This embodiment can obtain another light amount distribution (such as the light amount distribution 503 or 504) by parallel moving one light amount distribution (such as the light amount distribution 502).

The luminance distribution acquirer 104b acquires, from the ROM 112, a light intensity distribution center position (reference position) viewed from the image center when the light source on the right side emits light in the light emitter 200. The luminance distribution acquirer 104b acquires an inter-image light amount distribution (light amount distribution within the imaged angle of view) corresponding to a state in which the light source on the right side emits light, based on the acquired light amount distribution center position and the light amount distribution information acquired in the step S102. Then, the luminance distribution acquirer 104b acquires a reciprocal of the acquired inter-image light amount distribution as information on the luminance distribution (luminance correction value distribution) for the image captured while the light source on the right source emits light. In order to acquire the inter-image light amount distribution, part of the light amount distribution information acquired in the step S102 may be cut out so that the center position of the light amount distribution coincides with the light amount distribution center position acquired from the ROM 112. For the other light emission pattern, the light amount distribution center position may be acquired by acquiring the light amount distribution center position corresponding to each light emission pattern, and the inter-image light amount distribution may be acquired.

According to this embodiment, the luminance correction value distribution is the reciprocal of the inter-image light amount distribution, but the present invention is not limited to this embodiment. The luminance correction value distribution may not be the reciprocal of the inter-image light amount distribution as long as the ratio of the light amount distribution to each light source can be corrected. This embodiment calculates the light amount distribution unlimited to the image area, and acquires the light amount distribution within the image area for each light source through cutting so that the image position is matched. However, the present invention is not limited to this embodiment. For example, the light amount distribution for each light source may be obtained directly from the light amount distribution information so as to correspond to each image area.

Next, in the step S104, the corrector 104c corrects the captured image acquired in the step S101 using the luminance correction value distribution acquired in the step S103. Thereby, the image processor 104 can acquire a corrected image in which the influence according to the inter-image light amount distribution (difference of each image data by the light amount distribution for each light source that emits light in imaging) is corrected.

Next, in the step S105, the normal estimator 104d estimates (calculates) the normal information of the object by the photometric stereo method using the luminance value of the corrected image corresponding to each of the at least three light sources acquired in the step S104. Then, the image recorder 109 stores the estimated normal information and image information, and completes this flow.

The imaging apparatus 10 (image processor 104) according to this embodiment corrects, among a plurality of image data, the light amount distribution on the object surface by causing the at least three light sources to individually emit the light. Thereby, the error can be reduced between the plurality of image data due to the light amount distribution (uneven illuminance) caused by the light source position and the light distribution characteristic, and the normal information of the object can be estimated with high accuracy. The image processor 104 acquires the luminance correction value distribution corresponding to each light source based on the light amount distribution information common to each light source. Thereby, the storage capacity and computational load can be reduced.

Although this embodiment discusses the correction of uneven illuminance, the scattering light amount emitted from each light source may be further corrected. This embodiment acquires the corrected image in the step S104 and estimates the normal information based on the corrected image in the step S105, but the present invention is not limited to this embodiment. For example, the normal information may be estimated based on the captured image acquired in the step S101 and the luminance correction value distribution acquired in the step S103. In this modification, for example, the intensity E of the incident light may be treated as a vertical vector in consideration of the difference between the light sources in the expression (3).

Second Embodiment

Referring now to FIGS. 6A to 6D, a description will be given of a second embodiment according to the present invention. The basic configuration and processing method of the imaging apparatus according to this embodiment are the same as those in the first embodiment, and thus the description thereof will be omitted.

The light amount distribution information according to this embodiment is a rotationally asymmetrical light amount distribution on the object plane. The rotationally asymmetric light amount distribution is, for example, light amount distribution information 601 illustrated in FIG. 6A. The light amount distribution information 601 is vertically symmetrical (of line symmetry). Hence, this embodiment can store data relating to the upper half of the light amount distribution information 601 as a discrete table, and acquires the entire data. This embodiment may acquire coefficients through a proper function approximation, etc., or use another method.

The luminance distribution acquirer 104b acquires information on a plurality of luminance distributions (luminance correction value distributions) corresponding to each image data based on the acquired light amount distribution information. FIGS. 6B-6D respectively illustrate light amount distributions 602, 603, and 604 on the object surface when the light source on the right side, the light source on the upper right side, and the light source on the upper side emit light in the light emitter 200. The plurality of light amount distributions 602, 603, and 604 are symmetric with each other with respect to the optical axis OA in the imaging optical system 101 or the image center (the center of the imaging surface of the image sensor 102). In other words, for example, as the light amount distribution 602 is rotated at a certain angle around the image center, the light amount distributions 603 and 604 can be obtained. Unlike the light amount distributions 502, 503, and 504 in the first embodiment, in the plurality of light amount distributions 602, 603, and 604, another light amount distribution cannot be obtained by parallel moving one light amount distribution.

This embodiment acquires, as light amount distribution information, the light amount distribution 603 in the object space when the light source on the right side emits light. Hence, as the light amount distribution information obtained in the step S102 is cut out according to the image area to be imaged by the imaging apparatus 10, the inter-image light amount distribution in the light emission of the light source on the right side, and the reciprocal of it is acquired as the luminance correction value distribution. The other light emission patterns can also be acquired by rotating the light amount distribution 603 acquired as common light amount distribution information by a predetermined angle around the image center and by cutting out it according to the angle of view (image area).

The imaging apparatus 10 (image processor 104) according to this embodiment corrects, among a plurality of image data, the light amount distribution on the object surface when the at least three light sources individually emit light. Thereby, the error can be reduced between the plurality of image data due to the uneven illuminance caused by the light source position or the light distribution characteristic, and the normal information of the object can be estimated with high accuracy. The image processor 104 acquires the luminance correction value distribution corresponding to each light source based on the light amount distribution information common to each light source. This configuration can reduce the storage capacity and computational load.

Each embodiment calculates the normal information of the object in the imaging apparatus 10, but may calculate the normal information of the object using a processing system different from the imaging apparatus 10. In this case, the imaging apparatus 10 may be operated under control of a different processing system. For example, the image processor 104, the light amount distribution information acquirer 104a, the luminance distribution acquirer 104b, the corrector 104c, and the normal estimator 104d may be configured as a program on the different image processing apparatus such as a PC. In this case, the light amount distribution information may be written as additional information, such as header information of the image, by the imaging apparatus and may be read out by the image processing apparatus. While the light amount distribution information is stored in the illuminating apparatus 20 in each embodiment, the present invention is not limited to this embodiment. For example, the light amount distribution information stored in the image processing apparatus such as a PC may be acquired (selected) based on the ID of the illumination apparatus 20 and the information on the light emission in imaging. Alternatively, the image processing apparatus, such as the PC, may acquire the light amount distribution information from another server etc., based on information on the identification of the illumination apparatus 20 and a light emission in imaging. The light amount distribution information and identification of the illumination apparatus 20 may be sent from the illumination apparatus 20 to the PC or from the imaging apparatus 10 to the PC. In acquiring the luminance correction value distribution, the luminance correction value distribution in the imaging area may be acquired based on the imaging condition (zoom, imaging distance, etc.) in imaging.

In each of the embodiments, the imaging apparatus 10 includes the image sensor 102 that photoelectrically converts an object image formed by the imaging optical system 101 while the light sources 200a to 200h individually emit light at three or more different positions, and outputs a plurality of image data. The luminance distribution acquirer 104b acquires a plurality of luminance distributions of each of the plurality of image data based on the light amount distribution information common to the light source positions. The plurality of luminance distributions may be luminance correction value distributions for correcting the influence on the luminance value in the image data by the light amount distribution of the light source that emits light in acquiring the image data.

When at least three light emitters are provided at different light source positions and turned on to capture an object, a luminance change of the object according to the light source position or an object appearance change can be acquired and the information of the normal can be acquired by the photometric stereo method. When the object is imaged by turning on the respective light sources, in general, the luminance becomes uneven because the light amount irradiated onto the object by the light sources varies depending on the angle of view. As described above, the photometric stereo method needs to equalize the incident light amount at the same position on the object or at the same pixel position on the image. In order to make the light amount for each light source uniform in a certain angle of view range, it is necessary to introduce parallel light, but this is difficult for a general imaging apparatus having a degree of freedom in imaging distance. Since the light source is also required to be placed far enough, it is particularly more difficult for the illumination apparatus that is detachable from the imaging apparatus. Unlike a measurement apparatus, the general imaging apparatus needs to complete imaging within an appropriate exposure time period, and the light emitter often uses a plurality of light emitting elements such as LEDs in order to obtain a light emission amount necessary for imaging. Using a plurality of light emitting elements as described above also causes the uneven illuminance.

Accordingly, this embodiment effectively removes light amount scattering for each light source caused by the uneven illuminance or the influence of the light amount distribution (uneven illuminance) using the information on the luminance distribution (luminance correction value distribution) for correcting the luminance of the image. The luminance correction value distribution refers to a luminance correction value corresponding to an image area for each image corresponding to different light emitters. FIGS. 5B-5D and 6B-6D illustrate illustrative light amount distributions (uneven illuminances) in the image areas corresponding to different light emitters. FIGS. 5A-5D correspond to the case of rotationally symmetrical light intensity distribution (uneven luminance), and FIGS. 6A-6D correspond to the rotationally asymmetrical light amount distribution (uneven illuminance). FIGS. 5B-5D and 6B-6D correspond to the right side, upper right side, and upper side in the light emitter, respectively. The luminance correction value distribution is a correction value for equalizing the influences of the light amount distributions (uneven illumination) on the luminance value among the images, and is, for example, a reciprocal of the illuminance. The luminance correction value distribution is not used to correct the difference in the appearance of the object due to the positional difference of the light source that emits the light.

Since the luminance correction value distribution differs depending on the position of the light emitter and the optical system, the distribution is generally different for each light emitter. In order to acquire the luminance correction value distribution in accordance with the imaging distance and the angle of view range in which the optical system captures an image, the data capacity of the correction value increases and the processing load in acquiring the correction value also increases. This embodiment can reduce the data capacity and the processing load by acquiring these mutually different luminance correction value distributions based on the common light amount distribution information (common information).

While the luminance correction value distribution is a value for the imaging area, the light amount distribution information is, for example, distribution information of the irradiation light amount regardless of the position of each light emitter based on the light emitter position. In other words, the distribution is determined independently of the image area to be imaged. An illustrative distribution of the irradiated light amount is illustrated in FIGS. 5A and 6A. The information indicating the illuminance distribution is the light amount distribution information. For example, the illuminance distribution value itself in irradiating a plane at a fixed distance may be stored as the light amount distribution information, or the data capacity may be reduced by having the coefficient for fitting the illuminance distribution with a function such as a polynomial. It may be stored as the angle characteristic of the irradiated light amount instead of the illuminance distribution on the two-dimensional surface, so that the angle characteristics of the respective light sources are common with respect to the angle relative to an axis parallel to the optical axis in the imaging optical system. This embodiment can acquire common light amount distribution information independent of the light emitter, and the luminance correction value distribution corresponding to the light source position or the image area.

Each of the plurality of luminance correction value distributions may be asymmetric (rotationally asymmetric or point symmetric) with respect to the optical axis of the imaging optical system. The plurality of luminance correction value distributions are mutually symmetrical (rotationally symmetrical or point symmetrical) with respect to the optical axis in the imaging optical system.

As described above, since the luminance correction value distribution differs depending on the position of the light emitter, the optical system, the imaging distance, and the imaging angle of view range for the optical system, a rotational symmetry control is difficult and the rotational asymmetrical control is advantageous in terms of the design size and cost, etc. By making the plurality of luminance correction value distributions rotationally symmetric with respect to the optical axis of the imaging optical system, the plurality of luminance correction value distributions can be acquired based on the light amount distribution information common to each of the light sources. Then, the luminance correction value distribution for another light source can be acquired by applying the rotation operation to the luminance correction value distribution for one light source, and the processing load in acquiring the luminance correction value distribution can be reduced.

The plurality of luminance correction value distributions are translationally symmetrical (have a shiftable relationship) with each other. By making the plurality of luminance correction value distributions translationally symmetric with respect to the direction perpendicular to the optical axis in the imaging optical system, the plurality of luminance correction value distributions can be acquired based on the light amount distribution information common to each of the light emitters. Then, by applying the translational operation to the luminance correction value distribution for one light source, the luminance correction value distribution for another light source can be acquired, and the processing load in acquiring the luminance correction value distribution can be reduced.

The light amount distribution information may be a rotationally asymmetrical light amount distribution. As described above, the light emitter uses a plurality of light emitting elements, a light source having a certain size such as a xenon tube or a lamp, and a light projection optical system for irradiating the light emitted from the light source to the object side and thus it is difficult to rotationally symmetrically control the light amount distribution information. Therefore, the rotationally asymmetric light amount distribution is advantageous in terms of design size and cost, arrangement freedom degree of the light projection optical system, and the like.

In each embodiment, the illumination apparatus 20 is an accessory that can be attached to and detached from the imaging apparatus 10, and includes a light emitter 200 and a communicator 113. The light emitter 200 can individually emit light at three or more different light source positions. The communicator 113 transmits, to the imaging apparatus 10, information (such as an accessory ID) for acquiring common light amount distribution information regarding the light source position in the light emitter 200. Alternatively, the illumination apparatus 20 includes a memory (ROM 112) that stores the common light amount distribution information on the light source position, and the communicator 113 transmits the light amount distribution information to the imaging apparatus 10.

The light emitter may include a plurality of light sources 200a to 200h arranged at different light source positions. Alternatively, the light emitter may include one light source and a moving unit for moving the one light source, and can emit light at different light source positions by moving the one light source using the moving unit. The light emitter may include a light source and a light projection optical system that emits light emitted from the light source to the object side. The different positions of the light emitter may be symmetrical with respect to the optical axis in the imaging optical system in the imaging apparatus. The light emitter may include a rotationally asymmetric optical system. The light emitter may include an optical system that is symmetrical (rotationally symmetrical) with respect to the optical axis in the imaging optical system in the imaging apparatus.

For use with a general imaging apparatus, the light emitter may select a specification, such as the light amount and the light distribution characteristic suitable for the distance to the object, the brightness of the environment, and the like. The light emitter is an illumination apparatus independent of the imaging apparatus. Then, since the light amount distribution information changes depending on the illumination apparatus, the light amount distribution of the illumination apparatus may be communicated. Control information etc. on the machine model information of the illumination apparatus or the light amount distribution that is variable may be communicated as the information capable of specifying the light amount distribution information instead of communicating the light amount distribution information. The illumination apparatus configured as a single illumination apparatus enables single information as common light amount distribution information to be communicated, and make known the relationship of the position, direction, etc. between the light emitters, so that the luminance correction value distribution can be easily obtained from the common light amount distribution information. The illumination apparatus configured detachable from the imaging apparatus can make known the relationship of the position, direction, etc. between the light emitter and the imager (imaging optical system 101, image sensor 102), and thus the light amount distribution information when considered can be easily acquired based on the optical axis direction of the imaging optical system. The position and orientation of the light emitter can be accurately determined by mounting it as a device, and the luminance correction value distribution depending on the imager can be obtained with high accuracy.

The light emitter may include a light source and a light projection optical system that emits light emitted from the light source toward the object side. For use with a general imaging apparatus, the imaging distance and the imaging angle of view may have freedom degrees. Then, when the light emitter includes only a light source, the light utilization efficiency lowers and the uniformity is insufficient. Accordingly, the light projection optical system used for irradiation enables the light distribution control to improve the light utilization efficiency and the uniformity. Then, the light projection optical system may have a common shape. In other words, the ray effective areas of the respective projection optical systems may be substantially congruent or similar to each other. One of the plurality of light projection optical systems may include a member having the same shape as the other light projection optical systems. The shape of the projection optical system may strongly influence the light amount distribution of light irradiated through the projection optical system. The light amount distributions under the respective light emission patterns can be made similar to each other by making the shapes of the respective light projection optical systems common. This configuration can accurately obtain the luminance correction value distribution in each light emission pattern from the common light amount distribution information.

The light emitter may be symmetrical (rotationally symmetrical) with respect to the optical axis in the imaging optical system. The light emitters arranged at rotationally symmetrical positions with respect to the optical axis in the imaging optical system can easily provide the luminance correction value distribution with a symmetrical distribution, and reduce the processing load in obtaining a plurality of luminance correction values based on common light amount distribution information. When an orientation can be defined, such as where the light emitter is a surface light source or includes a light projection optical system, etc., the orientation as well as the position may have a rotationally symmetrical relationship.

The light emitter may have a rotationally asymmetric optical system. Assume that the light emitters are arranged around the imaging optical system. Then, the arrangement of a plurality of light sources and surface light sources becomes easy by using the rotationally asymmetric optical system such as a radially expanding arrangement. Since the light emitter area can be easily expanded, the light distribution can be controlled by the light projection optical system to improve the light utilization efficiency and uniformity.

The light emitters may be arranged at circumferentially different positions around the optical axis in the imaging optical system. The thus arranged light emitters can easily make the luminance correction value distribution symmetrical to each other, and reduce the processing load in acquiring a plurality of luminance correction value distributions based on the common light amount distribution information.

The luminance correction value distribution may vary depending on the imaging condition. The imaging condition may include a focal length (zoom position) of the imaging optical system, an object distance (imaging distance, focus position), the light source position, or the light distribution characteristic of the light source. Since the luminance correction value distribution depends on the imaging range, the luminance correction value distribution is acquired based on the zoom function of the imaging optical system and the focal length when the interchangeable lens is interchanged. Since the luminance correction value distribution depends on the object distance and the light amount distribution information also depends on the object distance when stored as the illuminance on the object surface, the luminance correction value distribution is accurately obtained based on the object distance. The object distance may be acquired by a known method such as acquiring focus information of an imaging optical system and using a stereo optical system. Since the luminance correction value distribution depends on the relationship between the imager and the light source position, the luminance correction value distribution can be accurately acquired based on the light source position. Since the luminance correction value distribution depends on the light distribution characteristic of the light emitter, the luminance correction value distribution can be accurately acquired based on the light distribution characteristic.

The light amount distribution information may differ depending on the light distribution characteristic of the light emitter. Since the light amount distribution information depends on the light distribution characteristic of the light emitter, the luminance correction value distribution can be accurately acquired based on the light distribution characteristic. In particular, when the light distribution characteristic of the light emitter is controllable, the luminance correction value distribution may be acquired based on the control information of the light distribution characteristic.

The imaging apparatus 10 may include the corrector 104$c$ that corrects a plurality of image data based on the information on the luminance distribution. The uneven illuminance difference among the images can be effectively eliminated by correcting a plurality of images (image data) to generate a corrected image. When the normal information is estimated by the photometric stereo method, the normal information of the object can be accurately acquired through this corrected image.

The imaging apparatus 10 may include the normal estimator 104$d$ that estimates the normal information of the object based on the luminance correction value distribution and the plurality of image data. The normal information of the object can be accurately acquired by estimating the normal information from a plurality of images in which the illuminances between the images are effectively combined based on the luminance correction value distribution. In acquiring the normal information, the photometric stereo method may be applied to the image whose luminance value has been corrected using the luminance correction value distribution. Any method may be used as long as it is effectively reduce the influence of the uneven illuminance between images, such as correcting the incident light intensity E in the expression (1) in acquiring the normal for each light source, correcting the acquired normal based on the illuminance difference, etc.

The imaging apparatus 10 may include a memory (ROM 111) that stores the light amount distribution information. Unlike the measurement apparatus that can fix the positional relationship among an imaging apparatus, an object, and a light source, it is difficult for an imaging apparatus for imaging a general object to set a reference object and to perform imaging for each light source. Accordingly, the light amount distribution information may be previously stored in the memory in the imaging apparatus. The light amount distribution information to be stored may be calculated based on the design value, or may be calculated based on the luminance value obtained by imaging a plain flat plate in the actual manufacture or adjustment.

The imaging apparatus 10 may include the communicator 114 that communicates with the illumination apparatus 20 having a light source, and the light amount distribution information acquirer 104$a$ that acquires the light amount distribution information. The light amount distribution information acquirer acquires the light amount distribution information or information (accessory ID or the like) for acquiring the light amount distribution information from the illumination apparatus through the communicator.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide an imaging apparatus, an accessory, a processing apparatus, a processing method, and a storage medium, each of which can correct the uneven illuminance among a plurality of images with a small amount of data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-94869, filed on May 16, 2018, which is hereby incorporated by reference herein in its entirety.

What is claimed is:

1. An imaging apparatus comprising:
an image sensor configured to photoelectrically convert an object image formed by an imaging optical system in at least three states in which positions of light sources configured to emit light are different from each other, and to output at least three image data; and
at least one processor configured to execute a plurality of instructions to function as:
a luminance distribution acquirer configured to acquire information on a plurality of correction value distributions respectively used for correction of a luminance value of each of the at least three image data;
a corrector configured to correct the at least three image data using the plurality of correction value distributions so as to decrease a luminance distribution due to an uneven illuminance in each of the at least three image data; and
a normal estimator configured to estimate normal information of an object based on the at least three corrected images corrected by the corrector using the plurality of correction value distributions,
wherein each of the plurality of correction value distributions is acquired based on one piece of information on a light amount distribution of a light source, the one piece of information being common to the plurality of correction value distributions.

2. The imaging apparatus according to claim 1, wherein one of the plurality of correction value distributions is equal to a correction value distribution obtained by rotating another of the plurality of correction value distributions around an optical axis of the imaging optical system.

3. The imaging apparatus according to claim 1, wherein one of the plurality of correction value distributions is equal to a correction value distribution obtained by parallel moving another of the plurality of correction value distributions.

4. The imaging apparatus according to claim 1, wherein the one piece of information is information on a rotationally asymmetric light amount distribution.

5. The imaging apparatus according to claim 1, further comprising:
a communicator configured to communicate with an illumination apparatus including the light source; and
a light amount distribution information acquirer configured to acquire the one piece of information,
wherein the light amount distribution information acquirer acquires the one piece of information or information for acquiring the one piece of information from the illumination apparatus via the communicator.

6. The imaging apparatus according to claim 1, wherein the plurality of correction value distributions are different according to an imaging condition.

7. The imaging apparatus according to claim 6, wherein the imaging condition includes at least one of a focal length of the imaging optical system and an object distance.

8. The imaging apparatus according to claim 6, wherein the imaging condition includes at least one of the position of the light source and a light distribution characteristic of the light source.

9. A processing apparatus comprising:
an image acquirer configured to acquire at least three image data which are imaged in at least three states in which positions of light sources configured to emit light are different from each other, and to output the at least three image data; and
at least one processor configured to execute a plurality of instructions to function as:
a luminance distribution acquirer configured to acquire information on a plurality of correction value distributions respectively used for correction of a luminance value of each of the at least three image data;
a corrector configured to correct the at least three image data using the plurality of correction value distributions so as to decrease a luminance distribution due to an uneven illuminance in each of the at least three image data; and
a normal estimator configured to estimate normal information of an object based on the at least three corrected images corrected by the corrector using the plurality of correction value distributions,
wherein each of the plurality of correction value distributions is acquired based on one piece of information on a light amount distribution of a light source, the one piece of information being common to the plurality of correction value distributions.

10. A processing method comprising the steps of:
acquiring at least three image data which are imaged in at least three states in which positions of light sources configured to emit light are different from each other, and to output the at least three image data;
acquiring information on a plurality of correction value distributions respectively used for correction of a luminance value of each of the at least three image data;
correcting the at least three image data using the plurality of correction value distributions so as to decrease a luminance distribution due to an uneven illuminance in each of the at least three image data; and
estimating normal information of an object based on the at least three corrected images corrected using the plurality of correction value distributions,
wherein each of the plurality of correction value distributions is acquired based on one piece of information on a light amount distribution of a light source, the one piece of information being common to the plurality of correction value distributions.

11. A non-transitory storage medium storing a program that causes a computer to execute a processing method, wherein the processing method includes the steps of:

acquiring at least three image data which are imaged in at least three states in which positions of light sources configured to emit light are different from each other, and to output at least three image data;

acquiring information on a plurality of correction value distributions respectively used for correction of a luminance value of each of the at least three image data;

correcting the at least three image data using the plurality of correction value distributions so as to decrease a luminance distribution due to an uneven illuminance in each of the at least three image data; and estimating normal information of an object based on the at least three corrected images corrected using the plurality of correction value distributions, wherein each of the plurality of correction value distributions is acquired based on one piece of information on a light amount distribution of a light source, the one piece of information being common to the plurality of correction value distributions.

* * * * *